United States Patent [19]

Inagaki et al.

[11] Patent Number: 5,508,081
[45] Date of Patent: Apr. 16, 1996

[54] POROUS MATERIAL COMPOSED OF LAYERED SILICA AND METAL OXIDE AND A PROCESS FOR MANUFACTURING THE SAME

[75] Inventors: Shinji Inagaki; Yoshiaki Fukushima; Akane Okata, all of Aichi; Chuzo Kato; Kazuyuki Kuroda, both of Tokyo, all of Japan

[73] Assignee: Kabushiki Kaisha Toyota Chuo Kenkyusho, Tokyo, Japan

[21] Appl. No.: 192,933

[22] Filed: Feb. 7, 1994

Related U.S. Application Data

[63] Continuation of Ser. No. 820,167, Jan. 13, 1992, abandoned.

[30] Foreign Application Priority Data

Jan. 14, 1991 [JP] Japan .................................. 3-014702

[51] Int. Cl.$^6$ ....................................................... B32B 3/12
[52] U.S. Cl. .................. 428/116; 428/312.6; 428/312.8; 428/446; 428/697; 428/699; 428/701; 428/702; 502/60; 502/61; 502/64; 502/80; 502/242; 502/251; 502/250; 502/263
[58] Field of Search ........................ 428/312.6, 312.8, 428/446, 701, 702, 703, 472, 697, 699, 116; 502/60, 61, 64, 80, 242, 251, 250, 263

[56] References Cited

U.S. PATENT DOCUMENTS

| | | | |
|---|---|---|---|
| 4,748,082 | 5/1988 | Dörr | 428/703 |
| 4,803,060 | 2/1989 | Occelli | 502/61 |
| 4,837,193 | 6/1989 | Akizuki | 502/242 |
| 4,859,648 | 8/1989 | Landis | 502/242 |
| 4,919,907 | 4/1990 | Occelli | 502/61 |
| 4,987,106 | 1/1991 | Mizutani | 502/80 |
| 5,064,790 | 11/1991 | Bedard | 428/328 |
| 5,098,684 | 3/1992 | Kresege et al. | 423/277 |
| 5,102,643 | 4/1992 | Kresege et al. | 423/328 |
| 5,139,760 | 8/1992 | Ogawa | 428/402 |

Primary Examiner—Ellis P. Robinson
Assistant Examiner—Timothy M. Speer
Attorney, Agent, or Firm—Stroock & Stroock & Lavan

[57] ABSTRACT

A porous material composed of many $SiO_4$ tetrahedra sheets having interlayer bridges of $SiO_2$. It has pores having a diameter of 10 Å or above, and possesses the properties of a solid acid formed by the isomorphous substitution of metal atoms for Si of $SiO_4$ frameworks. It is made by a process including introducing an organic substance into interlayer space of crystals of layered silicates to expand the spacing between crystal layers, as well as forming bridges of $SiO_2$ therebetween, bringing the intercalated compounds into contact with a metal salt to link metal atoms to the $SiO_4$ frameworks, and firing the products. The material can withstand a temperature of 800° C., has a pore diameter larger than that of zeolites, etc., and is useful in making an adsorbent or catalyst for molecules having a high molecular weight, such as a catalyst for the catalytic cracking of petroleum.

15 Claims, 4 Drawing Sheets

POROUS MATERIAL COMPOSED OF LAYERED SILICA AND METAL OXIDE AND A PROCESS FOR MANUFACTURING THE SAME

This is a continuation of application Ser. No. 07/820,167 filed Jan. 13, 1992 for POROUS MATERIAL COMPOSED OF LAYERED SILICA AND METAL OXIDE AND A PROCESS FOR MANUFACTURING THE SAME, now abandoned.

BACKGROUND OF THE INVENTION

1. Field of the Invention

This invention relates to a porous material composed of layered silica and metal oxide, and to a process for manufacturing the same. More particularly, it is concerned with a porous material composed of layered silica and metal oxide which is useful as an adsorbent, or catalyst for molecules having a high molecular weight, and which has a particularly high heat resistance.

2. Description of the Related Art

Zeolites are typical of the porous materials which are used as catalysts or adsorbents. Zeolites are widely used as adsorbents and catalysts, since they are composed of $SiO_2$ and $Al_2O_3$, and have numerous pores which are suitable for molecular adsorption, and possess the properties of solid acids which they owe to aluminum. It has, however, been impossible to use zeolites as adsorbents or catalysts for molecules having a high molecular weight, or bulky molecules, as their pores generally have diameters which are smaller than 10 Å, and do not, therefore, admit those molecules.

Pillared clays have been synthesized to improve the drawbacks of zeolites as hereinabove pointed out, as described in U.S. Pat. No. 4,216,188. The pillared clays have the structure of cross-linking of clays unit layers with metal oxides, and have a pore diameter of several tens of angstroms which is larger than that of zeolites. They have, therefore, the advantage of being useful as catalysts and adsorbents for molecules having a high molecular weight, or bulky molecules.

The pillared clays can, however, withstand a maximum temperature of only about 600° C., since the clay minerals, such as smectite, contain "structure" water. If they are heated to a higher temperature, their pore structure is destroyed as a result of the loss of the structure water. They cannot, therefore, be used as catalysts for the catalytic cracking of petroleum, or for the purification of exhaust gas which are exposed to a temperature in the neighborhood of 800° C.

SUMMARY OF THE INVENTION

It is, therefore, an object of this invention to provide an adsorbent or catalyst material having a sufficiently large pore diameter for use as a catalyst, or adsorbent for molecules having a high molecular weight, or bulky molecules, and a sufficiently high level of heat resistance for use as a catalyst for, among others, the catalytic cracking of petroleum or the purification of exhaust gas, and a process for manufacturing the same.

The inventors of this invention have considered that the object of this invention can be attained if a porous material having a desired pore diameter which is larger than that of zeolites can be produced from crystals of layered silicates which contain $SiO_4$ tetrahedra sheets having good heat-resistant properties, and if their difficulty in interlayer expansion can be overcome.

According to a first aspect of this invention, there is, thus, provided a porous material comprising many $SiO_4$ tetrahedra sheets having interlayer bridges of $SiO_2$ formed by the condensation of silanol groups with the elimination of water, the material having a multiplicity of pores with a diameter of 10 Å or above, and possessing the properties of a solid acid formed by the linkage of metal atoms or isomorphous substitution of metal atoms for Si of $SiO_2$ frameworks.

According to a second aspect of this invention, there is provided a process for manufacturing a porous material which comprises the steps of:

(a) introducing an organic substance having a diameter of 10 Å or above by ion exchange into the interlayer space of crystals of layered silicates, and forming interlayer bridges of $SiO_2$ by condensation of surface silanols;

(b) bringing the intercalated compounds into contact with a salt of a metal other than silicon; and (c) firing the products at a high temperature to remove organic composition and to fix the metal ion into the frameworks; the steps being carried out in the order of either (a), (b) and (c); (b), (a) and (c); (a) and (b) at the same time and (c); or (a), (c), (b) and (c).

Other features and advantages of this invention will become apparent from the following description and the accompanying drawings.

DETAILED DESCRIPTION OF THE INVENTION

Referring to the first aspect of this invention in further detail, the porous material comprises crystals of layered silicates. More specifically, it may comprise crystalline layered sodium silicates, i.e. crystals containing sodium ions between silicate layers, such as kanemite ($NaHSi_2O_5 \cdot 3H_2O$), sodium disilicate ($Na_2Si_2O_5$), makatite ($Na_2Si_4O_9 \cdot 5H_2O$), ilerite ($Na_2Si_8O_{17} \cdot xH_2O$), magadiite ($Na_2Si_{14}O_{29} \cdot xH_2O$), and kenyaite ($Na_2Si_{20}O_{41} \cdot xH_2O$).

The crystalline layered sodium silicates differ from clay minerals in that they do not contain any structure water, and that the hydroxyl groups of silicate layer are consumed to form interlayer bridges of $SiO_2$ as a result of condensation with the elimination of water. They can, therefore, retain their pore structure even at a high temperature. The sodium silicates composed of single tetrahedral layers of crystals, such as kanemite, have very thin layers having silanol groups which are useful for forming the frameworks, and are, therefore, particularly useful for making a porous material having a large surface area and thereby a high adsorbing or catalytic capacity. Kanemite makes a porous material having a honeycomb cross-section defined by upper and lower layers of crystals which are bent and partly bonded to each other, and pores which are formed by an organic substance in unbonded portions, while retaining a single-layer structure.

The diameter of the pores depends on the length of the organic substance which is employed. Pores having a diameter which is smaller than 10 Å are of little meaning, as they do not appreciably differ from the pores of zeolites. Although there is no particular limit to the maximum pore diameter, pores having a diameter exceeding 200 Å are less easy to make because of the limited availability of an appropriate organic substance, and are moreover of little practical use. The pores may have a substantially uniform diameter, or a diameter in a wide range of, say, 10 to 40 Å.

The interlayer bridges of $SiO_2$ are formed by the condensation with the elimination of water which occurs between the hydroxyl groups bonded to silicon in adjoining layers of $SiO_4$ tetrahedra.

A solid acid is formed by the linkage of metal atoms by oxygen to a part of silicon atoms forming tetrahedral layers. It acts as a Lewis acid, or if water is added to it, it forms a Brönstead acid which liberates a proton. In either event, the solid acid exhibits a catalytic action. Examples of the appropriate metal atoms are aluminum, zirconium, gallium, beryllium, magnesium, yttrium, lanthanum, tin and lead.

Figure 1:
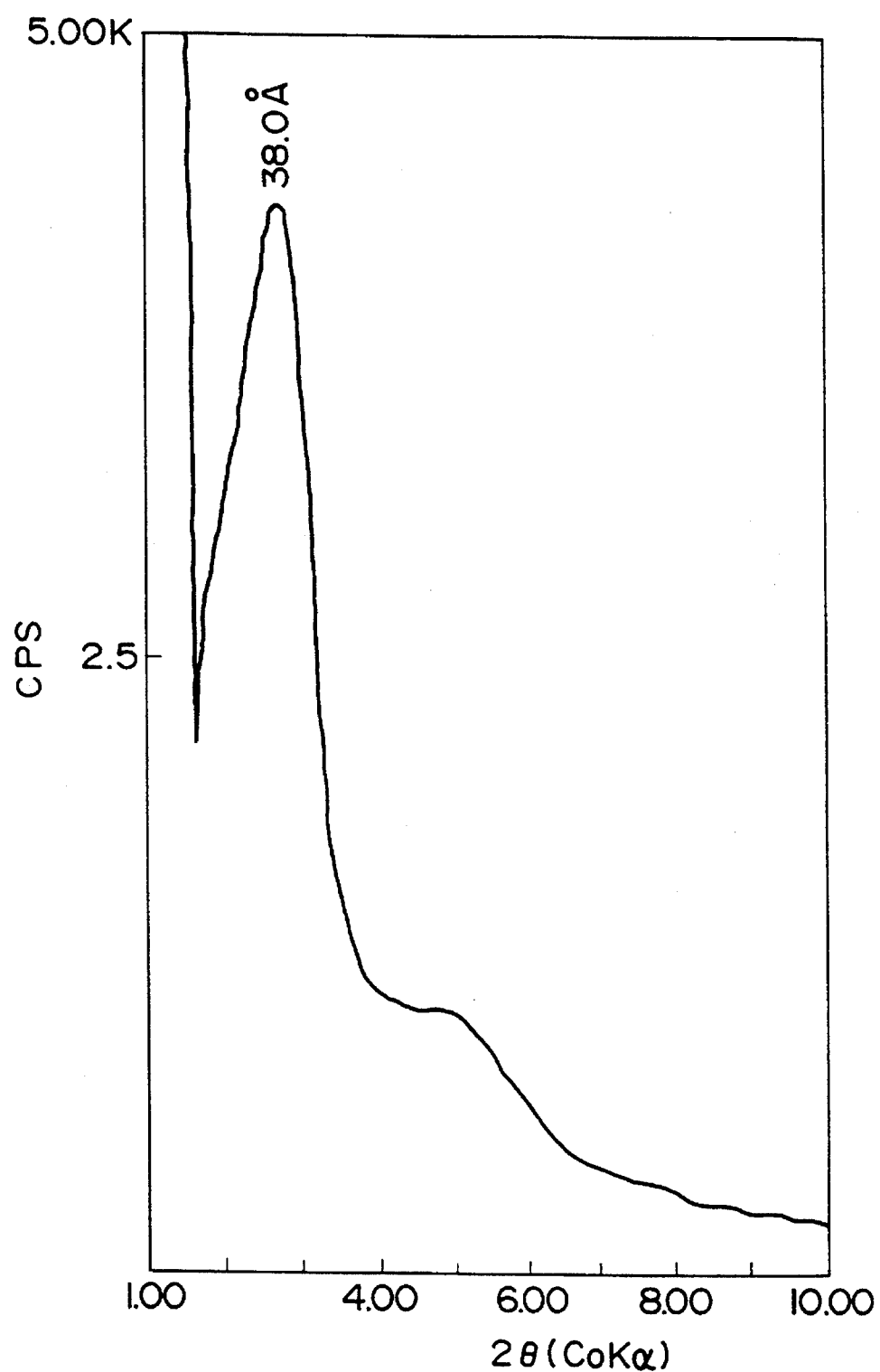
FIG. 1 is a graph showing the X-ray powder diffraction pattern of a porous material embodying this invention.
Figure 2:
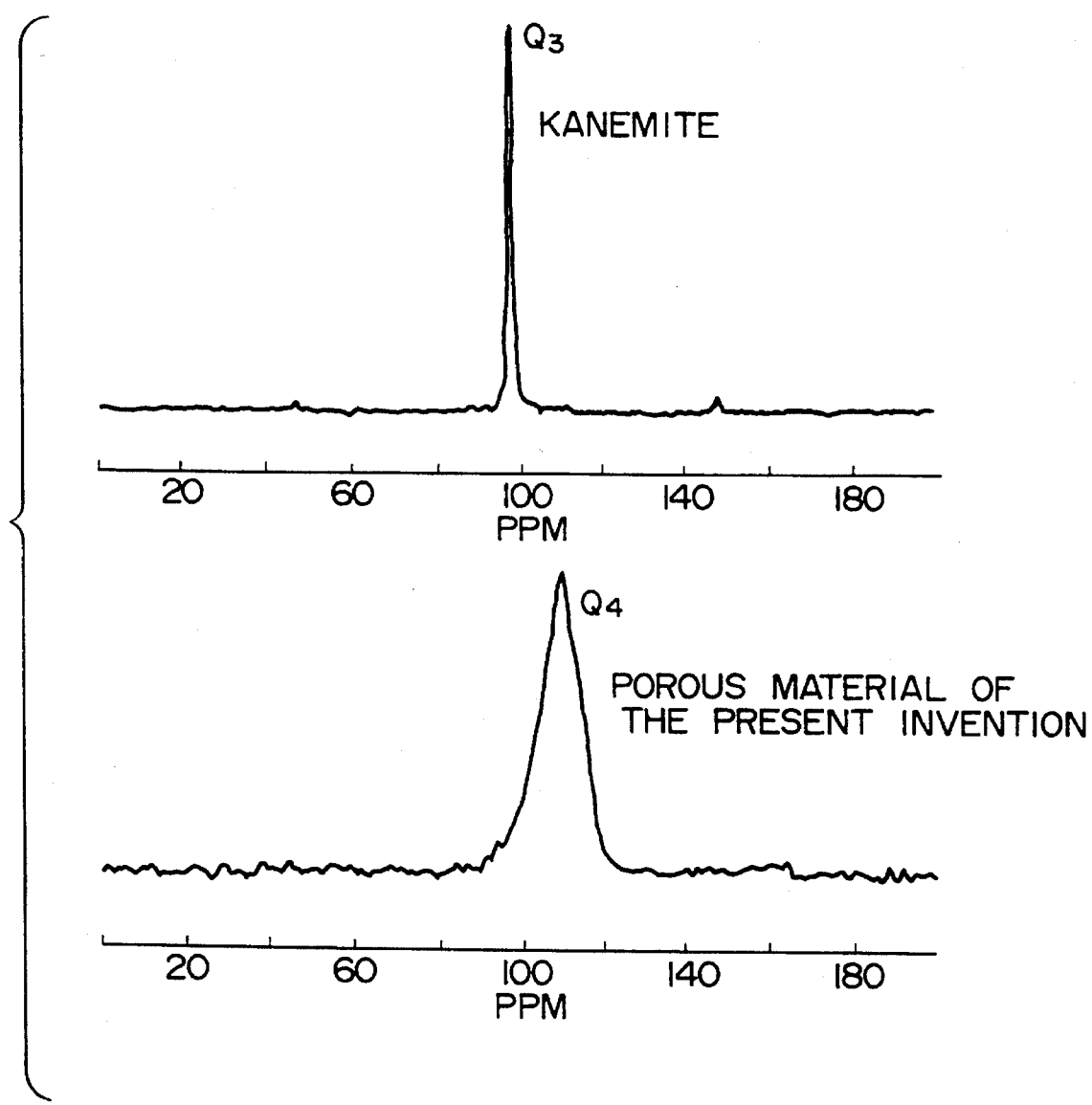
FIG. 2 is a graph showing the $^{29}$Si-MAS NMR spectra of kanemite and a porous material embodying this invention.
Figure 3:
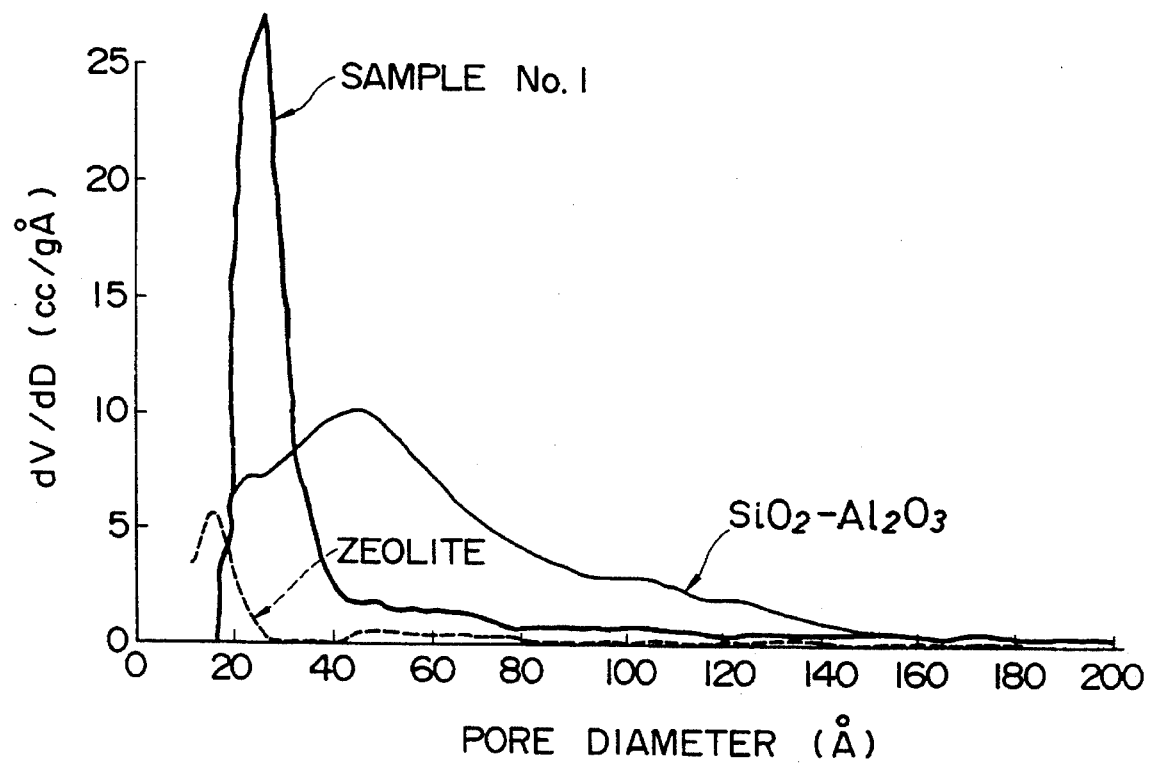
FIG. 3 is a graph showing the pore diameter distributions of a porous material embodying this invention, zeolite (ZSM-5) and amorphous silica-alumina (JRC-SAL2)

A porous material of this invention which had been made by employing cetyltrimethylammonium chloride as the organic substance was analyzed by X-ray powder diffraction, and showed a peak only at 38 Å, as shown in FIG. 1. This result taught that the porous material had a basal spacing of 38 Å. The porous material was also analyzed by $^{29}Si$-MAS NMR, and showed a peak assigned the $Q_4$ environment in $SiO_4$ tetrahedra ($\underline{Si}(OSi\equiv)_4$), while kanemite, which had been used as the starting material, showed a peak assigned the $Q_3$ environment (O $\underline{Si}(OSi\equiv)_3$), as shown in FIG. 2. The results confirmed the formation of interlayer linkages defining a three-dimensional network in the porous material of this invention, while no such linkage had been formed in kanemite. Moreover, an adsorption isotherm for nitrogen as obtained from the porous material of this invention confirmed that it had a sharp pore diameter distribution with a peak at about 30 Å, as shown in FIG. 3.

The sheet of $SiO_4$ tetrahedra and the three-dimensional network of $SiO_2$ have so high a level of heat resistance that the porous material of this invention can retain its pore structure even at a temperature of about 800° C. The metal atoms bonded to the framework are also so stable to heat that the porous material can maintain the properties of a solid acid even at a high temperature. The porous material of this invention is, therefore, useful in making e.g. a catalyst for catalytic cracking, or exhaust gas purification, as opposed to the known materials including pillared clays. Moreover, it has a multiplicity of pores having a diameter of 10 Å or above and is, therefore, suitable for making an adsorbent or catalyst for molecules having a high molecular weight, or bulky molecules, as opposed to e.g. zeolites.

Referring now to the process of this invention in detail, the introduction of an organic substance is carried out by exchanging cations of the organic substance for sodium ions in the interlayer of the crystal of layered silicates. Although the crystalline layer sodium silicates, such as kanemite, are generally difficult to expand between layers, since they do not swell with water, while clays do, the introduction of an organic substance by ion exchange enables their interlaminar expansion.

Although there is no particular limitation to the kinds of cations to be introduced, it is preferable to employ organic onium ions, particularly alkylammonium ions, since they are easy to prepare and have a high exchange capacity. The molecular size or weight of the organic substance employed has a direct bearing on the diameter of the pores to be formed in the porous material of this invention. The use of an organic substance having an appropriate molecular size or weight makes it possible to achieve a desired interlaminar spacing not smaller than 10 Å and thereby a desired pore diameter.

If only a single kind of organic substance is employed, it is possible to make a product having a narrow pore diameter distribution, or a substantially uniform pore diameter, and if a plurality of different organic substances having different molecular sizes or weights are employed, it is possible to make a product having a broad pore diameter distribution. The former product has the advantage of, for example, being able to yield a product of cracking having a molecular size equal to the pore diameter and thereby eliminate the necessity for any subsequent refining, when used for a catalyst for the catalytic cracking of heavy oil.

Good results of ion exchange and interlayer expansion can be obtained if the step is carried out in an autoclave, or the like at a somewhat high temperature, e.g. about 65° C. for a relatively long time, e.g. about a week.

Referring now to the step (b) of the process, there is no particular limitation to the metal salt to be employed, or the method employed for bringing the intercalated compounds into contact with the salt. It is, however, effective to, for example, immerse the intercalated compounds in a solution of the metal salt, or mix a powder of the intercalated compounds with a powder of the metal salt. In the former case, it is preferable to dry the products after immersion and stirring, so that they may be fired more efficiently. The product of the step (b) has the properties of a solid acid owing to the linkage of metal atoms by oxygen to a part of silicon atoms forming the tetrahedron.

The step (c) for firing is preferably carried out at a temperature of about 500° C. to about 800° C., and continued for several hours. The use of too high a firing temperature is likely to result in the destruction of a porous structure and the use of too low a temperature is likely to result in a small surface area because of remains of organic component in the pores. There is no particular limitation to the environment in which firing is carried out. It is sufficient to carry it out in the air. It is, however, preferable to employ an atmosphere containing added oxygen, or ozone to promote the decomposition of the organic substance. The thermal decomposition of the organic substance which takes place during the firing step enables the formation of a porous structure supported by the interlayer bridges of $SiO_2$, and the fixing of the linkage of the metal atoms to the frameworks.

If the steps composing the process of this invention are carried out in the order of (a), (b) and (c); (b), (a) and (c); (a) and (b) at the same time and (c), the introduction of the organic substance by ion exchange, the formation of interlayer bridges by $SiO_2$, and the linkage of metal atoms to the frameworks take place substantially at the same time, and are followed by a single firing operation to yield a porous material. If the steps are carried out in the order of (a), (c), (b) and (c), the steps (a) and (c) perform the formation and fixing of a porous structure including interlayer bridges, and are followed by the steps (b) and (c) performing the linkage of metal atoms to yield a porous material having the properties of a solid acid.

The process of this invention can manufacture a porous material having a desired pore diameter and a desired pore diameter distribution from crystals of layered silicates by overcoming their difficulty in interlaminar expansion.

The invention will now be described more specifically with reference to several examples thereof.

EXAMPLE 1

An autoclave made of TEFLON (polytetrafluoroethylene) was charged with 300 ml of a 0.1N aqueous solution of cetyltrimethylammonium chloride containing 3 g of kanemite, and was heated at 65° C. under shaking for a week. The resulting product of reaction was collected by filtration, rinsed with water, and dried to yield an intercalated compound containing the organic substance between kanemite layers. The analysis of the compound by X-ray powder diffraction indicated that it had a basal spacing of about 41 Å. Two grams of the compound were added to a solution containing 0.3 g of $AlCl_3.6H_2O$ in 50 ml of ion exchange water, and the solution was stirred for about three hours by a stirrer. The resulting product was left to stand at 80° C. overnight in an electric oven to dry. Then, it was fired at 700° C. in the air for six hours to yield a porous material embodying this invention (Sample No. 1).

Sample No. 2 was prepared by repeating the process employed for preparing Sample No. 1, except that 0.3 g of $AlCl_3.6H_2O$ was replaced by 0.4 g of $Al(NO_3)_3.9H_2O$.

Sample No. 3 was prepared by repeating the process employed for preparing Sample No. 1, except that 0.3 g of $AlCl_3.6H_2O$ was replaced by 0.1 g of $NaAlO_2$.

EXAMPLE 2

Samples Nos. 4 to 6 of porous materials were prepared by repeating the process employed in EXAMPLE 1 for preparing Sample No. 1, except that 0.3 g of $AlCl_3.6H_2O$ was replaced by 0.5, 1.0, and 1.5 g, respectively, thereof.

EXAMPLE 3

Two solutions were prepared by dissolving 1.2 and 5.0 g, respectively, of $AlCl_3.6H_2O$ in 300 ml of a 0.1N aqueous solution of cetyltrimethylammonium chloride. An autoclave made of teflon was charged with each solution further containing 2 g of kanemite, and was heated at 65° C. under shaking for a week. The resulting product of reaction was collected by filtration, rinsed with water, and dried to yield an intercalated compound containing the organic substance between kanemite layers, and aluminum ions linked to the framework. The compound was fired at 700° C. in the air for six hours, whereby two Samples Nos. 7 and 8 of porous materials were obtained.

EXAMPLE 4

Samples Nos. 9 and 10 of porous materials were prepared by repeating the process employed in EXAMPLE 1 for preparing Sample No. 1, except that cetyltrimethylammonium chloride was replaced by undecyltrimethylammonium chloride and nonyltrimethylammonium chloride, respectively.

The intercalated compounds from which Samples Nos. 9 and 10 had been obtained had basal spacings of 26 and 30 Å, respectively, as determined by powder X-ray diffraction.

The B.E.T. surface area and pore volume of each of Samples Nos. 1 to 10 were determined from its adsorption isotherm for nitrogen. The results are shown in TABLE 1 below. For the sake of comparison, TABLE 1 shows also the B.E.T. surface areas and pore volumes of zeolite (ZSM-5) and amorphous silica-alumina (JRC-SAL2), respectively, as likewise determined, and those of a pillared clay as cited from literature.

TABLE 1

| Sample No. | B.E.T. surface area ($m^2/g$) | Pore volume (ml/g) |
| --- | --- | --- |
| 1 | 661 | 0.52 |
| 2 | 465 | 0.42 |
| 3 | 66.4 | 0.08 |
| 4 | 410 | 0.31 |
| 5 | 616 | 0.50 |
| 6 | 555 | 0.42 |
| 7 | 596 | 0.48 |
| 8 | 356 | 0.37 |
| 9 | 409 | 0.24 |
| 10 | 677 | 0.40 |
| Zeolite | 280 | 0.1 |
| $SiO_2$—$Al_2O_3$ | 524 | 0.7 |
| Pillared clay | 400 | 0.3 |

The pore diameter distribution of Sample No. 1 was determined from its nitrogen adsorption isotherm. Those of the zeolite (ZSM-5) and the amorphous silica-alumina (JRC-SAL2) were likewise determined. The results are shown in FIG. 3.

The properties of each of Samples Nos. 1 to 10 as a solid acid were determined from its $NH_3$-TPD spectrum. The results are shown in TABLE 2 below by way of acid amount. TABLE 2 shows also the acid amounts of the zeolite (ZSM-5) and the amorphous silica-alumina (JRC-SAL2), respectively, as likewise determined, and that of the pillared clay as cited from literature.

TABLE 2

| Sample No. | Acid amount (millimole/g) |
| --- | --- |
| 1 | 0.560 |
| 2 | 0.784 |
| 3 | 0.140 |
| 4 | 0.695 |
| 5 | 0.939 |
| 6 | 1.041 |
| 7 | 0.264 |
| 8 | 0.531 |
| 9 | 0.480 |
| 10 | 0.510 |
| Zeolite | 1.160 |
| $SiO_2$—$Al_2O_3$ | 0.870 |
| Pillared clay | 0.353 |

Figure 4:
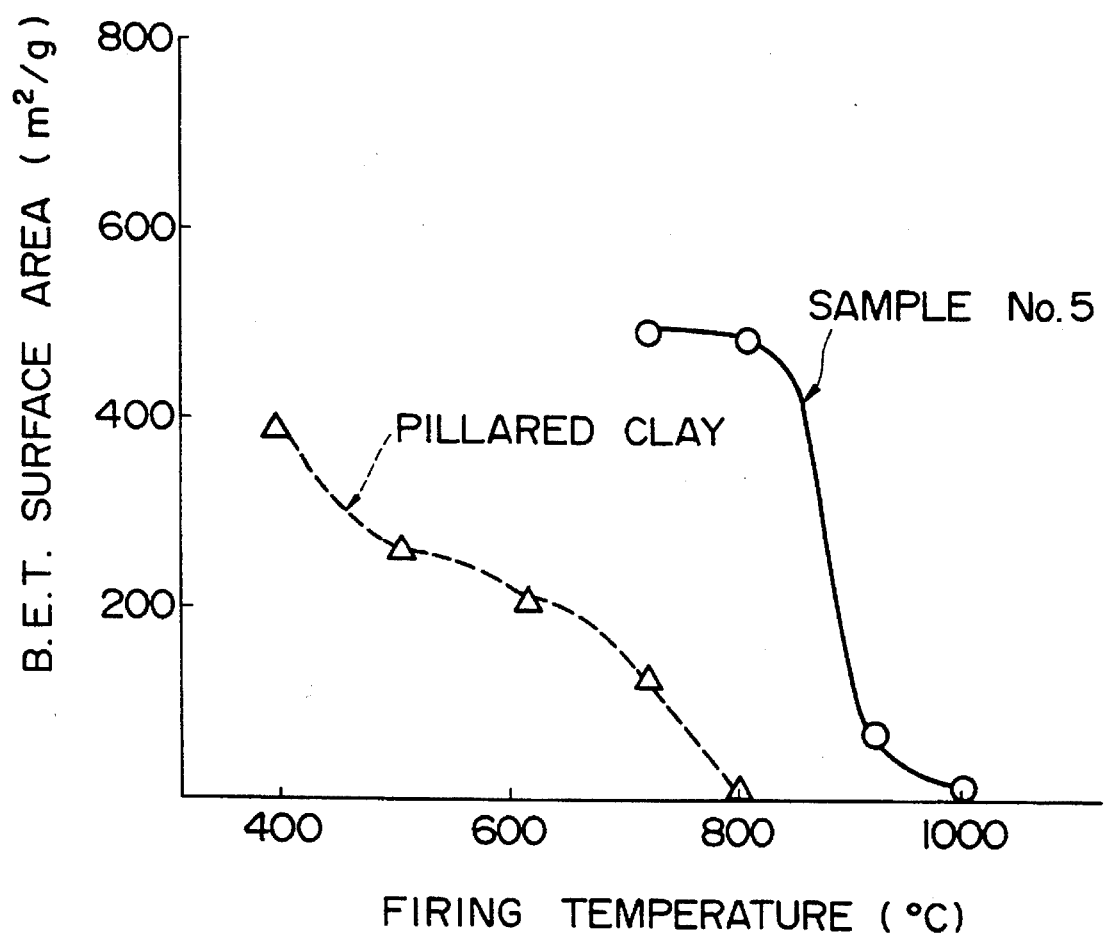
FIG. 4 is a graph showing the B.E.T. surface areas of a porous material embodying this invention and a pillared clay in relation to a varying firing temperature.

Sample No. 5 was fired at different temperatures in the air for six hours and its change in B.E.T. surface area was examined as a measure of its heat resistance. The results are shown in FIG. 4. FIG. 4 shows also the similar data on the pillared clay as cited from literature.

What is claimed is:

1. A porous material comprising a plurality of single layer $SiO_4$ tetrahedra sheets having interlayer bridges of $SiO_2$ between adjacent single layer $SiO_4$ tetrahedra sheets formed by condensation of silanol groups with elimination of water, said material having a multiplicity of pores with a diameter of at least about 20 Å, said pores being substantially uniform in diameter, the single layer $SiO_4$ tetrahedra sheets having bent portions, said bent portions of adjacent single layer $SiO_4$ tetrahedra sheets being partly bonded to each other to form said interlayer bridges and a porous structure having a generally honeycomb cross-section defined by the adjacent single layer $SiO_4$ tetrahedra sheets bounded by said interlayer bridges, said porous material possessing properties of a solid acid produced by the isomorphous substitution of metal atoms selected from the group consisting of aluminum, zirconium, gallium, beryllium, magnesium, yttrium, lanthanum, tin, lead and combinations thereof for a portion of the Si atoms of the $SiO_2$ bridges.

2. A porous material as set forth in claim 1, wherein said pores have a diameter of about 20 Å to about 40 Å.

3. A porous material as set forth in claim 1, wherein said pores have a diameter of substantially at least 26 Å.

4. A porous material formed with a plurality of single layer $SiO_4$ tetrahedra sheets having interlayer bridges of $SiO_2$ between adjacent single layer $SiO_4$ tetrahedra sheets, formed by a process comprising the steps of:

(a) introducing at least one organic substance having a molecular size of at least 20 Å by ion exchange into an interlayer space of crystals of layered silicates, and forming interlayer bridges of $SiO_2$ between adjacent single layer $SiO_4$ tetrahedra sheets by condensation of surface silanols;

(b) bringing said crystals into contact with a salt of a metal other than silicon; and (c) firing said crystals at a high temperature;

the steps being carried out in the order of either (a), (b) and (c); (b), (a) and (c); (a) and (b) at the same time and (c); or (a), (c), (b) and (c);

the above said steps of the process being performed to yield a porous material having a multiplicity of pores with a diameter of at least about 20 Å, said pores being substantially uniform in diameter, the single layer $SiO_4$ tetrahedra sheets having bent portions, said bent portions of adjacent single layer $SiO_4$ tetrahedra sheets being partly bonded to each other to form said interlayer bridges and a porous structure having a generally honeycomb cross-section defined by the adjacent single layer $SiO_4$ tetrahedra sheets bounded by said interlayer bridges, said porous material possessing properties of a solid acid produced by the isomorphous substitution of metal atoms selected from the group consisting of aluminum, zirconium, gallium, beryllium, magnesium, yttrium, lanthanum, tin, lead and combinations thereof for a portion of the Si atoms of the $SiO_2$ bridges.

5. The porous material of claim 4, wherein said pores have a diameter of substantially at least 26 Å.

6. The porous material of claim 4, wherein said ion exchange is carried out by exchanging cations of said organic substance for sodium ions existing between said layers.

7. The porous material of claim 6, wherein said cations are organic onium ions.

8. The porous material of claim 7, wherein said organic onium ions are alkylammonium ions.

9. The porous material of claim 6, wherein said cations are of a single organic substance.

10. The porous material of claim 6, wherein said cations are of a plurality, of different organic substances having different molecular sizes or weights.

11. The porous material of claim 4, wherein said step (a) is carried out at a temperature of about 65° C. and for a period of about a week.

12. The porous material of claim 4, wherein said step (b) is carried out by dipping said crystals in a solution of said salt.

13. The porous material of claim 4, wherein said step (b) is carried out by mixing a powder of said crystals with a powder of said salt.

14. The porous material of claim 4, wherein said step (c) is carried out at a temperature of 500° C. to 800° C. and for a period of several hours.

15. The porous material of claim 4, wherein said step (c) is carried out in an atmosphere containing added oxygen, or ozone.

* * * * *